(12) United States Patent
Hong et al.

(10) Patent No.: US 8,649,441 B2
(45) Date of Patent: Feb. 11, 2014

(54) NAL UNIT HEADER

(75) Inventors: Danny Hong, New York, NY (US); Jill Boyce, Manalapan, NJ (US); Won Kap Jang, Edgewater, NJ (US); Stephan Wenger, Hillsborough, CA (US)

(73) Assignee: Vidyo, Inc., Hackensack, NJ (US)

( * ) Notice: Subject to any disclaimer, the term of this patent is extended or adjusted under 35 U.S.C. 154(b) by 0 days.

(21) Appl. No.: 13/539,864

(22) Filed: Jul. 2, 2012

(65) Prior Publication Data

US 2012/0269276 A1 Oct. 25, 2012

Related U.S. Application Data

(63) Continuation of application No. 13/347,381, filed on Jan. 10, 2012.

(60) Provisional application No. 61/432,836, filed on Jan. 14, 2011.

(51) Int. Cl.
*H04N 7/26* (2006.01)

(52) U.S. Cl.
USPC .................................................. 375/240.25

(58) Field of Classification Search
CPC ................. H04N 19/00854; H04N 19/00884
USPC ............................ 375/E7.026, E7.027, 240.01
See application file for complete search history.

(56) References Cited

U.S. PATENT DOCUMENTS

| | | | |
|---|---|---|---|
| 2007/0086515 A1 | 4/2007 | Kirkenko et al. | |
| 2007/0110150 A1* | 5/2007 | Wang et al. | 375/240.1 |
| 2008/0007438 A1 | 1/2008 | Segali et al. | |
| 2008/0089411 A1 | 4/2008 | Wenger et al. | |
| 2008/0137753 A1 | 6/2008 | He | |
| 2009/0116562 A1 | 5/2009 | Eleftheriadis et al. | |
| 2009/0252220 A1 | 10/2009 | Choi et al. | |
| 2010/0020871 A1 | 1/2010 | Hannuksela et al. | |
| 2010/0067581 A1 | 3/2010 | Hong et al. | |
| 2010/0098157 A1* | 4/2010 | Yang | 375/240.12 |
| 2010/0150232 A1* | 6/2010 | Nguyen et al. | 375/240.12 |
| 2010/0158116 A1 | 6/2010 | Jeon et al. | |
| 2010/0189182 A1 | 7/2010 | Hannuksela et al. | |
| 2010/0195738 A1 | 8/2010 | Zhu et al. | |
| 2011/0134994 A1* | 6/2011 | Lu et al. | 375/240.02 |
| 2011/0182353 A1* | 7/2011 | Bae | 375/240.02 |
| 2012/0050475 A1* | 3/2012 | Tian et al. | 348/43 |
| 2012/0183077 A1 | 7/2012 | Hong et al. | |
| 2012/0275517 A1 | 11/2012 | Boyce et al. | |

FOREIGN PATENT DOCUMENTS

WO WO 2010/126613 11/2010

OTHER PUBLICATIONS

ITU-T Recommendation H.264, Nov. 2007.*

(Continued)

*Primary Examiner* — Mehrdad Dastouri
*Assistant Examiner* — Mohammed Rahaman
(74) *Attorney, Agent, or Firm* — Baker Botts, L.L.P.

(57) ABSTRACT

Disclosed are techniques for scalable, multiview, and multiple descriptive video coding using an improved Network Adaptation Layer (NAL) unit header. A NAL unit header can include a layer-id that can be a reference into a table of layer descriptions, which specify the properties of the layer. The improved NAL unit header can further include fields for reference picture management and to identify temporal layers.

20 Claims, 10 Drawing Sheets

(56) References Cited

OTHER PUBLICATIONS

Wang, Ye-Kui; Hannuksela, M.M.; Pateux, S.; Eleftheriadis, A.; Wenger, Stephan, "System and Transport Interface of SVC," Circuits and Systems for Video Technology, IEEE Transactions on , vol. 17, No. 9, pp. 1149,1163, Sep. 2007 doi: 10.1109/TCSVT.2007. 906827.*

U.S. Appl. No. 13/347,381, filed Jan. 10, 2012.

International Search Report and Written Opinion for PCT/US2012/020809, dated 3/21/20102.

U.S. Appl. No. 13/347,381, Oct. 12, 2012 Non-Final Office Action.

International Search Report and Written Opinion for PCT/US2012/028032, dated May 30, 2012.

Wiegand, et al., "Overview of the H.264/AVC Video Coding Standard", *IEEE Transaction of Circuits and System for Video Technology*, 13(7):560-576 (2003).

\* cited by examiner

| nal_unit( NumBytesInNALunit ) { | C | Descriptor |
|---|---|---|
| forbidden_zero_bit | All | f(1) |
| nal_ref_idc | All | u(2) |
| nal_unit_type | All | u(5) |
| NumBytesInRBSP = 0 | | |
| nalUnitHeaderBytes = 1 | | |
| if( nal_unit_type == 14 \|\| nal_unit_type == 20 ) { | | |
| svc_extension_flag | All | u(1) |
| if( svc_extension_flag ) | | |
| nal_unit_header_svc_extension( ) /* specified in Annex G */ | All | |
| else | | |
| nal_unit_header_mvc_extension( ) /* specified in Annex H */ | All | |
| nalUnitHeaderBytes += 3 | | |
| } | | |
| /* NAL unit data and start code emulation prevention (not shown) */ | | |
| } | | |

102 — forbidden_zero_bit
103 — nal_ref_idc
104 — nal_unit_type
105 — if( nal_unit_type == 14 ...
106 — svc_extension_flag
107 — if( svc_extension_flag )
108 — nal_unit_header_svc_extension
109 — nal_unit_header_mvc_extension

110

| nal_unit_header_svc_extension( ) { | C | Descriptor |
|---|---|---|
| idr_flag | All | u(1) |
| priority_id | All | u(6) |
| no_inter_layer_pred_flag | All | u(1) |
| dependency_id | All | u(3) |
| quality_id | All | u(4) |
| temporal_id | All | u(3) |
| use_ref_base_pic_flag | All | u(1) |
| discardable_flag | All | u(1) |
| output_flag | All | u(1) |
| reserved_three_2bits | All | u(2) |
| } | | |

111 — priority_id
112 — no_inter_layer_pred_flag
113 — dependency_id
114 — quality_id
115 — temporal_id

120

| nal_unit_header_mvc_extension( ) { | C | Descriptor |
|---|---|---|
| non_idr_flag | All | u(1) |
| priority_id | All | u(6) |
| view_id | All | u(10) |
| temporal_id | All | u(3) |
| anchor_pic_flag | All | u(1) |
| inter_view_flag | All | u(1) |
| reserved_one_bit | All | u(1) |
| } | | |

121 — priority_id
122 — view_id
123 — temporal_id

FIG. 2

| | 201 | | |
|---|---|---|---|
| prefix_nal_unit_svc( ) { | | C | Descriptor |
| if( nal_ref_idc != 0 ) { | | | |
| 202 — store_ref_base_pic_flag | | 2 | u(1) |
| if( ( use_ref_base_pic_flag \|\| store_ref_base_pic_flag ) && !idr_flag ) | | | |
| 203 — dec_ref_base_pic_marking( ) | | 2 | |
| /* extension mechanisms and byte alignment | | | |
| } | | | |
| } | | | |

FIG. 3

| | 301 | | |
|---|---|---|---|
| scalability_info( payloadSize ) { | | C | Descriptor |
| temporal_id_nesting_flag | | 5 | u(1) |
| priority_layer_info_present_flag | | 5 | u(1) |
| priority_id_setting_flag | | 5 | u(1) |
| 302 — num_layers_minus1 | | 5 | ue(v) |
| for( i = 0; i <= num_layers_minus1; i++ ) { | | | |
| 303 — layer_id[ i ] | | 5 | ue(v) |
| 304 — priority_id[ i ] | | 5 | u(6) |
| discardable_flag[ i ] | | 5 | u(1) |
| 305 — dependency_id[ i ] | | 5 | u(3) |
| 306 — quality_id[ i ] | | 5 | u(4) |
| 307 — temporal_id[ i ] | | 5 | u(3) |
| /* more layer description information */ | | | |
| } | | | |
| } | | | |

FIG. 7

| nal_unit( NumBytesInNALunit ) { | C | Descriptor |
|---|---|---|
|   forbidden_zero_bit | All | f(1) |
|   nal_ref_flag | All | u(1) |
|   nal_unit_type | All | u(6) |
|   NumBytesInRBSP = 0 | | |
|   nalUnitHeaderBytes = 1 | | |
|   if( nal_unit_type == 1 \|\| nal_unit_type == 4 \|\| nal_unit_type == 5) { | | |
|     layer_id | All | u(7) |
|     reserved | All | u(1) |
|   } | | |
|   /* NAL unit data and start code emulation prevention (not shown) */ | | |
| } | | |

701 (table), 702 (layer_id), 703 (reserved)

NAL UNIT HEADER

This application is a continuation of U.S. patent application Ser. No. 13/347,381 filed Jan. 10, 2012 which claims priority to U.S. Provisional Application Ser. No. 61/432,836, filed Jan. 14, 2011, titled "Improved NAL Unit Header for Supporting Quality/Spatial Scalability," the disclosures of each are hereby incorporated by reference in its entirety.

FIELD

This application relates to video compression systems, and more particularly to systems that use scalable/simulcast/multiview video coding techniques where two or more layers are used to represent a given video signal.

BACKGROUND

Certain commercial video compression techniques can use video coding standards to allow for cross-vendor interoperability. The present disclosure can be used with such a video coding standard, specifically ITU-T Rec. H.264, "Advanced video coding for generic audiovisual services", 03/2010, available from the International Telecommunication Union ("ITU"), Place de Nations, CH-1211 Geneva 20, Switzerland or http://www.itu.int/rec/T-REC-H. 264, and incorporated herein by reference in its entirety.

An initial version of H.264's was ratified in 2003, and included coding tools, for example a flexible reference picture selection model, that allows for temporal scalability. A subsequent version, ratified in 2007, added in Annex G an extension towards scalable video coding (SVC), including techniques for spatial scalability and quality scalability, also known as signal-to-noise (SNR) scalability. Yet another version ratified in 2009, included in Annex H multi-view coding (MVC).

Earlier versions of H.264 were designed without paying special regards to the requirements of later versions. This has resulted in a number of certain architectural shortcomings, for example in the design of the Network Adaptation Layer (NAL) Unit header, some of which are being addressed by the disclosed subject matter. Co-pending U.S. application Ser. No. 13/343,266, filed Jan. 4, 2012, titled "High Layer Syntax for Temporal Scalability," the disclosure of which is incorporated by reference herein in its entirety, addresses potential shortcomings at least in the signaling of temporal scalability, while co-pending U.S. provisional patent application Ser. No. 61/451,454, filed Mar. 10, 2012, titled "Dependency Parameter Set for Scalable Video Coding, the disclosure of which is incorporated by reference herein in its entirety, addresses potential shortcomings at least related to the signaling of layer dependencies.

In H.264, a bitstream is logically subdivided into NAL units. Each coded picture is coded in one or more slice NAL units. Many other NAL unit categories are also defined for different types of data, such as, for example, parameter sets, SEI messages, and so forth. In some cases, a NAL unit can be "parsing-independent" in that a loss of a NAL unit may not prevent the meaningful decoding and use of other NAL units. Accordingly, NAL units can be the placed into packets of packet networks subject to packet losses. This use case was one of the motivations for the introduction of the NAL unit concept over the bitstream concept known from earlier video compression standards such as MPEG-2 (ITU-T Rec. H.262 "Information technology—Generic coding of moving pictures and associated audio information: Video", 02/2000, available from http://www.itu.int/rec/T-REC-H.262, which is also known as MPEG-2 video, incorporated herein by reference).

Throughout the disclosure, syntax table diagrams following the conventions specified in H.264 are being used. To briefly summarize those conventions, a C-style notation is used. A boldface character string refers to a syntax element fetched from the bitstream (which can consist of NAL units separated by, for example, start codes or packet headers). The "Descriptor" column of the syntax diagram table provides information of the type of data. For example, u(2) refers to an unsigned integer of 2 bits length, f(1) refers to a single bit of a predefined value.

FIG. 1 shows a NAL unit header of baseline H.264 and the SVC and MVC extensions. The baseline NAL unit header is part of the NAL unit syntax specification, which is shown (101) with certain parts omitted so not to obscure the disclosure. Specifically, the NAL unit header includes a forbidden_zero_bit (102), two bits indicating the relative importance of the NAL unit for the decoding process (nal_ref_idc, 103), and five bits indicating the NAL unit type (104). For certain NAL unit types, namely types 14 and 20, which are defined as slice types for scalable and multiview coding, as indicated by the if( ) statement (105), a further svc_extension_flag bit (106) is included as well as either (107) a nal_unit_header_svc_extension( ) (108) or a nal_unit_header_mvc_extension( ) (109), as indicated (107) by the svc_extension_flag.

The C-function-style references of nal_unit_header_svc_extension( ) and nal_unit_mvc_extension( ) refer to syntax tables as shown as the SVC NAL unit header extension (110), and the MVC NAL unit header extension (120), respectively.

Of the SVC NAL unit header extension (110), of particular relevance in the context of this disclosure are the following fields:

The priority_id field (111) can be used to linearly signal the relative importance, as determined by the encoder, of a layer relative to other layers of the same scalable bitstream, where a layer can be any of a temporal, spatial, or SNR scalable layer. A dependent layer has a higher priority_id than the layer it depends on. Priority_id is not used by the H.264 decoding process definition, but can be used, for example by decoders or Media-Aware Network Elements (MANEs) to identify NAL units not required for the decoding of a certain layer (where that layer is lower in the layer hierarchy than the layer to which the NAL unit with the high priority_id value belongs). H.264 specifies certain constraints of its value based on the values of dependency_id, quality_id, and temporal_id.

The no_inter_layer-Pred_flag (112) indicates that the layer the NAL unit belongs to is not referring to any other layer for prediction. If set for all NAL units of a given layer, this flag can indicate that the layer can be decoded without regards of any other layer, allowing for techniques such as simulcasting.

The dependency_id field (113) indicates the spatial layer or coarse grain SNR scalable layer the NAL unit belongs to—the higher the value, the higher the layer. Quality_id and temporal_id indicate similar properties for SNR scalable and temporal scalable layers.

The MVC NAL unit extension header (120) includes the following pertinent fields.

Priority_id (121) and temporal_id (123) have similar semantics as described above for the SVC header priority_id (111) and temporal_id (115) fields. View_id identifies one out of up to 1024 "views" of a multiview system, which can, for example, be coded signals from different cameras at different geometric positions capturing the same scene in 3D space.

MVC allows for prediction across views, based on the observation that there can be redundancies between views that can be eliminated through prediction.

One goal during the specification of the scalable extension of H.264 has been to allow for the decoding of a scalable base layer by a legacy decoder that was designed before the ratification of the scalable extension, for example by a decoder conforming to any profile of the 2003 version of H.264. For this and other reasons, no backward incompatible changes have been introduced to the base layer syntax. However, there can be certain control information related to, or even affecting, base layer decoding in a scalable coding context (i.e. in conjunction with at least one enhancement layer), that may be not required in context of decoding of the base layer in isolation and, therefore, was not included in, for example the 2003 version of H.264. Some of this information can also be relevant for MVC. Syntax for information of this category was added to the scalable extension of H.264 by, for example, the mechanisms described next.

A first mechanism is the use of different NAL unit types for slice data belonging to scalable or multiview coding, which can trigger the presence of additional fields in the NAL unit header, as already described.

A second mechanism is the introduction of a prefix NAL unit. It uses one of the previously reserved NAL unit types, which means that a legacy decoder that does not recognize the reserved type would ignore its content, whereas a scalable or multiview decoder can interpret its content. The syntax of the prefix NAL unit (201) is shown in FIG. 2. The NAL unit can include a store_ref_base_pic_flag (202) indicating, among other things and only if additional conditions are met, the presence of base picture marking information (203). Though the precise nature of such information may not be particularly relevant for this disclosure, its content is required for the decoding process in a scalable decoding situation.

A third mechanism is known as the scalability_info SEI message. Supplementary Enhancement Information (SEI) messages, as defined in H.264, should not include information required for the decoding process, but are intended for information helpful for a decoder, MANE, or other parts of the overall system layout such as rendering.

The scalability information SEI message can be viewed as a description of the scalable bitstream, including aspects such as description of its layers, inter-layer dependencies, and so forth. The syntax table of the SEI message in the H.264 specification is approximately two pages long. Some parts of it relevant for this disclosure are reproduced in FIG. 3. The scalability information SEI message (301) includes a number of flags concerned with the scalable bitstream (i.e. all layers), which is followed by an integer indicating the number of layers (302). For each of the layers, the following fields are available.

A layer_id (303) field provides for an identification of the layer. It can be used, for example, to cross-reference the layer with other layer descriptions that are located in parts of the SEI message not depicted (such as, for example, inter-layer dependency descriptions). For example, the binding between a dependent layer and the layer it depends on, within the SEI message, is established through layer_id.

The priority_id (304), dependency_id (305), quality_id (306), and temporal_id (307) fields field have a meaning similar to what was already described in the context of the SVC NAL unit header fields with the same name.

All three mechanisms can be described as "bolt-on" to the non-scalable versions of H.264 (versions ratified before 2007). While preserving backward compatibility, the design is generally not characterized as elegant, can incur an unnecessarily high overhead for NAL units and pictures of the scalable extension, and can have error resilience issues.

As an example of unnecessarily high overhead, when using H.264's byte stream syntax, the overhead for a given NAL unit in the bitstream is at least four octets for the startcode. Similarly, when using an IP network and placing a NAL unit into its own packet, the overhead can be 40 octets or more (12 octets for the IP header, 8 octets for the UDP header, and 20 octets for the RTP header). While aggregation techniques as well as header compression techniques can reduce that overhead to a certain extent, reducing overhead further and/or avoiding it altogether would be preferable.

With respect to error resilience, FIG. 4 shows a simplified block diagram of a video conferencing system. An encoder (401) can produce a scalable bitstream (402) comprising NAL units belonging to more than one layer. Bitstream (402) is depicted as a bold line to indicate that it has a certain bitrate. The bitstream (402) can be forwarded over a network link to a media aware network element (MANE) (403). The MANE's (403) function can be to "prune" the bitstream down to a certain bitrate provided by second network link, for example by selectively removing those NAL units belonging to the highest layer. This is shown by the dotted line for the bitstream (404) sent from the MANE (103) to a decoder (405). If the scalable bitstream, (402) contains only NAL units of a base layer and one enhancement layer, then, after pruning, bitstream (404) contains only NAL units of the base layer. The decoder (405) can receive the pruned bitstream (404) from the MANE (403), and decode and render it.

In such an application, the potential unavailability of a scalability information SET message at the MANE very early in the connection—ideally before any coded slice NAL unit of any layer is received by the MANE in bitstream (402), can have negative consequences on the decoder behavior and/or incur unnecessarily high cost in the decoder implementation. For example, without knowing the scalability structure (for example: number of layers and their dependency), the MANE (403) may need to forward, and the decoder (405) may need to buffer and, to the extent possible, decode all NAL units it receives, even those it will not be using for rendering (for example because they belong to a spatial layer of a higher resolution than the display of a handheld device). Similarly, the MANE (403) can have great difficulty in deciding which NAL units to forward to a decoder of limited capability if it receives a scalable bitstream of high complexity (many layers), but is aware that a receiving decoder can process only a non-scalable bitstream or a scalable bitstream of low complexity (few layers). An SEI message, including the scalability information SEI message, can be unavailable because, for example, it was lost during the transmission of bitstream (402), or because the encoder (401) decides not to send the SET message, for example to save the bits of the message (which is conforming to the standard, although not advisable from an application design viewpoint).

A MANE also needs to maintain state, especially with respect to the content of the Scalability Information SEI message, so to make informed decisions about pruning. Such state can be established only by intercepting and interpreting all such SEI messages. While most MANES need to intercept and interpret some bitstream information, such as parameter set information to make meaningful decisions, very few of the numerous SEI messages have any meaning to a MANE. Intercepting all SEI messages just to extract and interpret those few which are meaningful for the MANE can be an onerous and computationally expensive process.

In short, H.264's scalable and multiview syntax related to the NAL unit header contains several potential shortcomings as a result of the "bolt-on" design of the scalable and multi-view extension. First, the NAL unit header for NAL units of extension headers can be unnecessarily large. Information pertaining to picture buffer management is sent in its own NAL unit (the prefix NAL unit), which can incur unnecessarily high overhead. In addition, information important for certain applications (such as information carried in the scalable information SEI message) are carried in SEI messages, which (a) does not reflect their critical nature (SEI can be discarded), and (b) may require unnecessary duplication of some information in, for example, the NAL unit header (such as: dependency_id, quality_id, view_id).

Recently, a High Efficiency Video Coding (HEVC) has been considered for standardization. A working draft of HEVC can be found at (B. Bross et. al., "WD4: Working Draft 4 of High-Efficiency Video Coding", available from http://wftp3.itu.int/av-arch/jctvc-site/2011_07_F_Torino/), referred to as "WD4" henceforth, which is incorporated herein by reference. HEVC inherits many high level syntax features of H.264. It can be advantageous to the success of HEVC if the potential shortcomings of H.264 described above were addressed before the standard is ratified.

SUMMARY

The disclosed subject matter provides for a NAL unit header that can be more efficient than the one described in H.264 or WD4, and can allow for lightweight MANE and decoder implementations. In conjunction with other techniques such as a Dependency Parameter set (DPS), as described in co-pending Ser. No. 61/451,454, and embedded in a high level syntax architecture as described in our co-pending patent application entitled "Techniques for Layered Video Encoding and Decoding," filed concurrently with the present application and assigned to the common assignee, the disclosure of which is incorporated by reference herein, the disclosed subject matter can overcome the potential shortcomings mentioned above.

In an embodiment, a NAL unit header includes a layer_id. The layer_id can, for example, be represented by an integer of, for example, six bits. The layer_id can refer to a description of the layer located in table of layer descriptions.

In the same or another embodiment, the table of layer descriptions is included in a dependency parameter set or a high level syntax structure serving a purpose substantially similar to a dependency parameter set.

In the same or another embodiment, the layer description referred to be the layer_id in the NAL unit header includes fields for at least one of a dependency_id, quality_id, view_id, a depth_map_flag, and a dependent_flag.

In the same or another embodiment, the depth_map_flag can indicate that the layer or layers it is associated with is/are a depth map. Association with a depth map, which can indicate, on a per sample basis, a third dimension (depth) of a sample, with a view, can be established using the view_id.

In the same or another embodiment, the NAL unit header includes a temporal_id and a layer_id. The temporal_id can refer to a temporal sub-layer of the (spatial/quality/view/depth-map) layer defined by the description referenced by the layer_id. Conceptually, this results in temporal layers not being considered layers in the sense that they have assigned a layer_id, which maps to HEVC's architecture in that HEVC's version 1, currently under development, is expected to allow for temporal scalability but not spatial/quality scalability or multiview features.

In the same or another embodiment, one pre-defined value of layer_id is reserved for an extension mechanism.

In the same or another embodiment, layer_id can co-serve as an indication of the position of the layer in layer hierarchy, not dissimilar to the common use (but not representation, constraints, or derivation mechanism) of priority_id in H.264.

In the same or another embodiment, the NAL unit header includes at least one of store_ref_base_pic_flag, and use_ref_base_pic_flag.

In the same or another embodiment, a slice header includes at least one of store_ref_base_pic_flag, and use_ref_base_pic_flag.

In the same or another embodiment, an encoder can create at least one NAL unit header as described above.

In the same or another embodiment, a MANE or a decoder can prune a scalable bitstream based on the layer_id, taking into account that the layer_id can indicate the position of the layer in a layer hierarchy.

BRIEF DESCRIPTION OF THE DRAWINGS

FIG. 1 presents syntax diagrams of NAL unit header and extensions in accordance with H.264.

FIG. 2 presents a syntax diagram of the prefix NAL unit in accordance with H.264.

FIG. 3 presents a syntax diagram of a scalability information SEI message in accordance with H.264.

FIG. 7 presents a syntax diagram of an improved NAL unit header in accordance with an embodiment of the disclosed subject matter.

Figure 4:
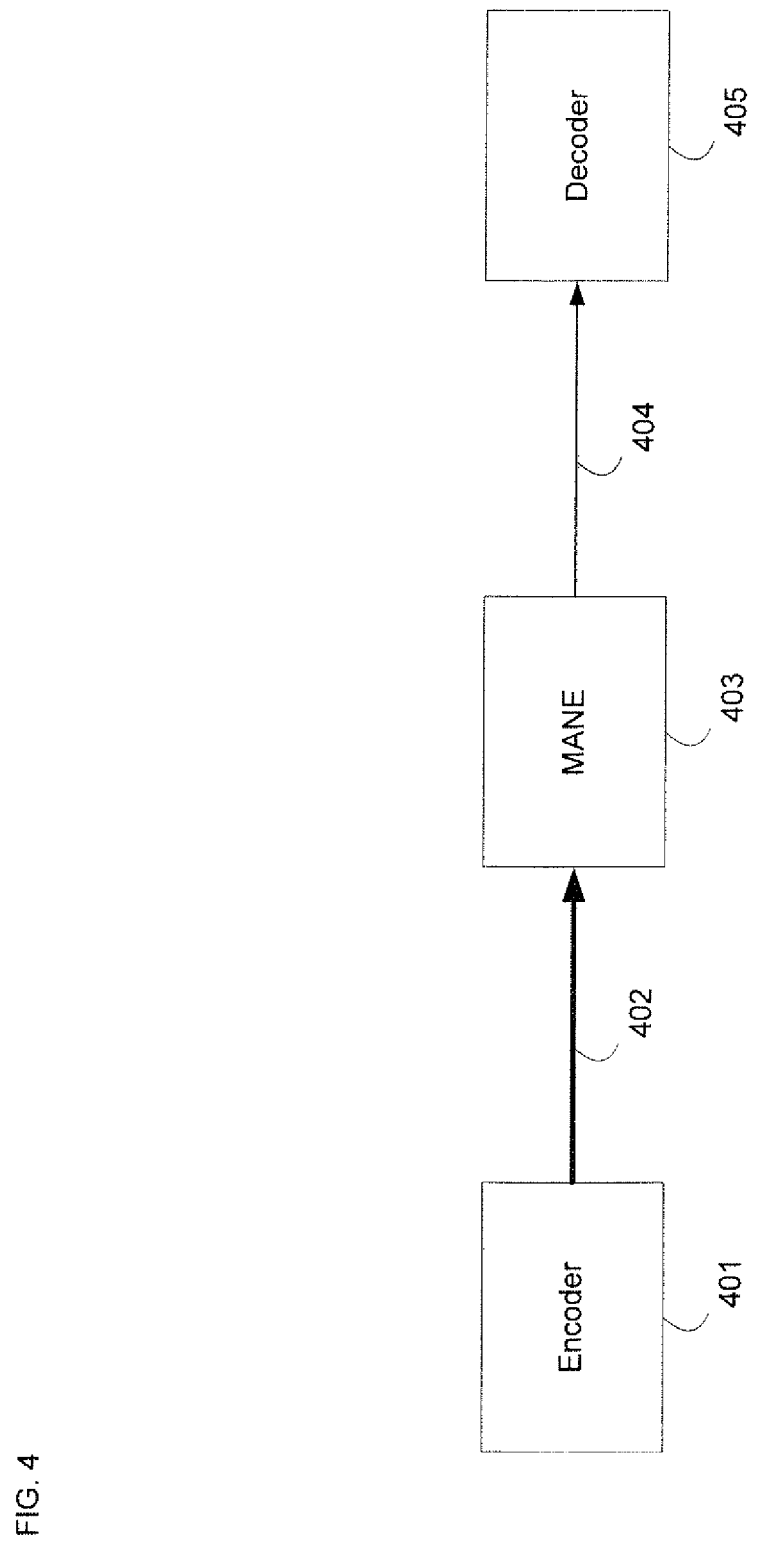
FIG. 4 presents a schematic illustration of a video conferencing system comprising encoder, MANE, and decoder.

The Figures are incorporated and constitute part of this disclosure. Throughout the Figures the same reference numerals and characters, unless otherwise stated, are used to denote like features, elements, components or portions of the illustrated embodiments. Moreover, while the disclosed subject matter will now be described in detail with reference to the Figures, it is done o in connection with the illustrative embodiments.

DETAILED DESCRIPTION

Figure 5:
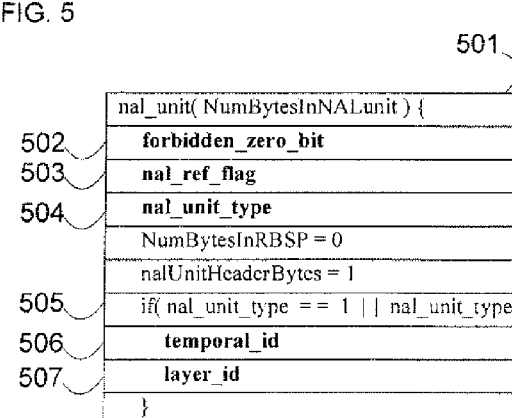
FIG. 5 presents a syntax diagram of an improved NAL unit header in accordance with an embodiment of the disclosed subject matter.

FIG. 5 presents a syntax diagram of a NAL unit header (501) in accordance with the disclosed subject matter. The NAL unit header can include the following flags and fields:

A forbidden_zero_bit (502) (for example 1 bit long, and forced to be 0) can be included so to prevent start code emulation with certain multiplex formats, such as MPEG-2 systems.

A nal_ref_flag (503) (for example 1 bit long) can be included. When set to 1, the flag can indicate that the NAL unit is required for the decoding process. This flag can allow a MANE and/or a decoder to identify NAL units not required for the decoding process, and, for example, discard such identified NAL units in case of insufficient bitrate and/or processing cycles.

A nal_unit_type (504), for example 6 bits long) can be included. The nal_unit_type indicates the type of the NAL unit. H.264 used up almost all of its allocated 24 NAL unit types and required certain extension mechanism to multiplex different NAL unit types to the same value of nal_unit_type; a six bit field allows for up to 64 NAL unit types and should, therefore, help to avoid the use of such extension mechanisms. NAL unit types can, for example, refer to parameter set NAL units of different types (such as: dependency parameter set, sequence parameter set, picture parameter set), slice NAL units of different types (such as: IDR-slice, P-slice, B-slice), SEI message NAL units, and so forth.

For those NAL unit types referring to coded slices (expressed by if( ) statement 505), the NAL unit header can additionally include a temporal_id (3 bits) (506) identifying the temporal sublayer to which the NAL unit belongs. Temporal layers have been described, for example, in Ser. No. 13/343,266. Also included in NAL unit headers for coded slices can be a layer_id (506) (5 bits).

The fields of the NAL unit header are shown as fixed length integers or as flags. The use of fixed length integers or flags has advantages from an implementation and specification viewpoint in the light that the NAL unit header can also be used as, for example, an RTP payload header. While an integer or Boolean representation of data in the NAL unit header may be preferable from this viewpoint, there are other considerations that can speak in favor of other entropy coding mechanisms of the NAL unit header information.

Figure 6:
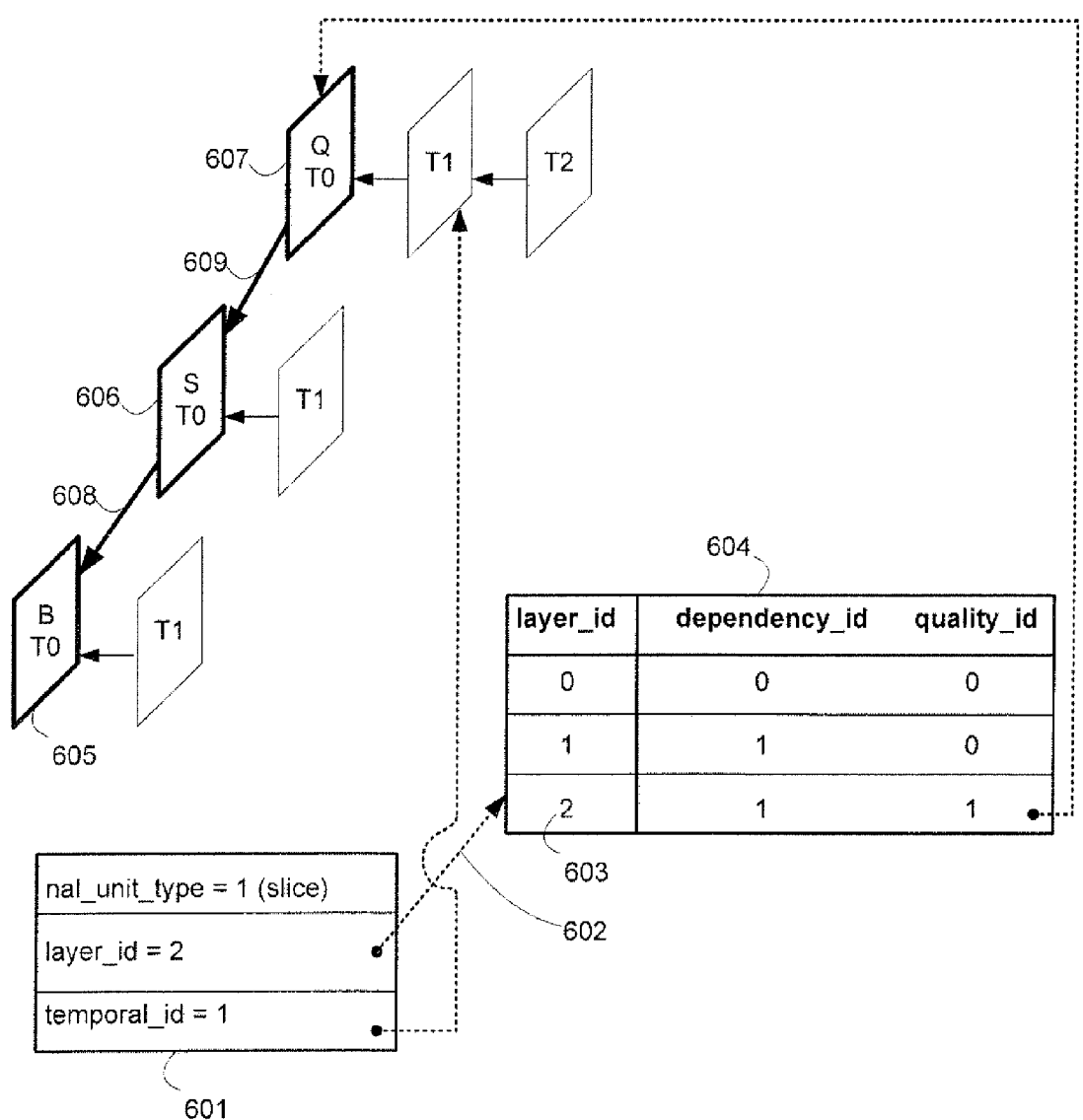
FIG. 6 presents a schematic illustration of the layer_id and temporal_id used by layers of a layer hierarchy and referencing a layer description in a table of layer descriptions.

FIG. 6 shows an example of the use of the improved NAL unit header (601). In this example, the NAL unit type is 1, indicating a slice. Layer_id is set to 2, and temporal_id is set to 1, indicating a reference to a first temporal enhancement sub-layer.

The layer_id can be used to reference (602) an entry with the same layer_id (603) in a table of layer descriptions (604). In the entry for layer_id 2 (603) the dependency_id is set to 1 and the quality_id is also set to 1. Not shown is the information that indicates the prediction relationships between layers; co-pending U.S. patent application Ser. No. 61/451,454 (DPS) includes a detailed description of this information. This reference (602) is shown in a punctuated line to differentiate the logical referencing between the layer_id in the NAL unit header and the layer_id in the table of layer descriptions from inter-layer prediction relationships, as described later.

A layer structure is also depicted. A base layer (605) with a temporal_id of 0 (as indicated by "T0" in the drawing) is used for prediction by a spatial enhancement layer (606), also with a temporal_id of 0. The spatial enhancement layer (606) is being referred to by a quality enhancement layer (607). The inter-layer prediction references as shown as boldface arrows, (608) and (609). Representations of these inter-layer prediction relationships may also be present in the table of layer descriptions, as already mentioned.

The entry in the table of layer descriptions referenced by layer_id=2 (603) refers through the values of dependency_id and quality_id to the quality enhancement layer (607) in the same way as the NAL unit de-referencing of dependency_id and quality_id was used to identify a target layer in H.264.

Also shown are numerous temporal enhancement sub-layers, denoted as T1 or T2 (for first and second temporal enhancement sub-layer, respectively). For example, the quality enhancement layer (607) has two temporal enhancement sub-layers, T1 (610) and T2 (611). Temporal enhancement sub-layers and their inter-layer prediction relationships are depicted in dotted in contrast to the boldface lines used to show base and enhancement layers and their inter-layer prediction relationship. The temporal_id field refers directly to the temporal_enhancement sub-layer that is based on base, or enhancement layer (indirectly) referred to by layer_id.

The layer_id can also co-serve as an indication of the position of a given layer in a layer hierarchy. In the example, layer (605) has a layer_id 0, layer (606) has a layer_id 1, and layer (607) has a layer_id 2. A MANE or a decoder in need of discarding NAL units of a layer or sub-layer can identify NAL units belonging to layers that can be discarded. For example, if the MANE or decoder finds itself in need to discard NAL units belonging to layer (606) (identified by layer_id 1), then it is clear that the inter-layer prediction relationship (609) may not be maintained and, accordingly, the MANE or decoder can also discard NAL units with layer_id larger than 1, for example layer_id=2. The same is true with respect to removing NAL units belonging to temporal sub-layers.

Figure 8:
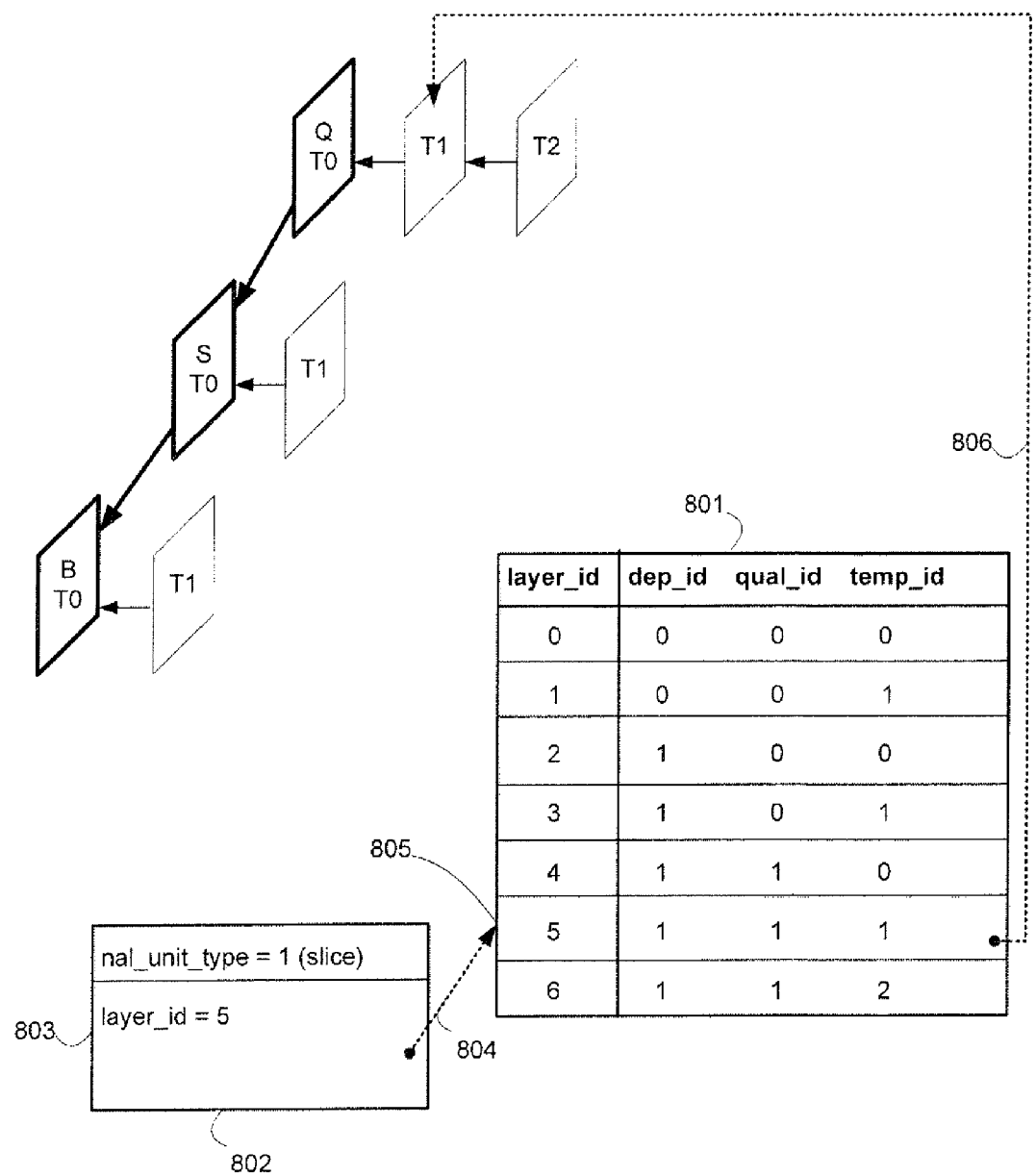
FIG. 8 presents a schematic illustration of the layer_id used by layers of a layer hierarchy and referencing a layer description in a table of layer descriptions.

FIG. 7 shows a syntax diagram of a different design of a NAL unit header (701). The first octet can be similar to the NAL unit header shown and described in FIG. 5. However, the second octet is at least partly populated by a layer_id (702), but omitting the temporal_id. Zero or more bits of the second octet can be left as reserved; shown is one such bit (703). In such a design, temporal layers are not considered sub-layers but qualify as layers, as shown in FIG. 8. The layer structure is similar to that of FIG. 6. However, the layer description table (801) is populated by all spatial, quality, and temporal enhancement layers. Accordingly, there are now 7 entries in the table. A NAL unit header (802) contains a layer_id (803), referring (804) to one entry (805) in the layer description table (801). This entry identifies, possibly among other fields, the dependency_id, quality_id, and temporal_id, and can be used to identify (806) the layer in all spatial, quality and temporal dimensions. As already described, the layer description table can also include entries for other dimensions, such as, for example, view_id, and/or depth_map_flag.

The mechanism described above also supports simulcasting. Simulcasting refers herein to a mechanism in which there can be multiple base layers, as shown in FIG. 9.

In order to support multiple base layer in a layering structure, a no_inter_layer_prediction_flag can be used to identify those layers that do not require any other layers for inter layer prediction. The flag can be located in entries in the layer description table.

Figure 9:
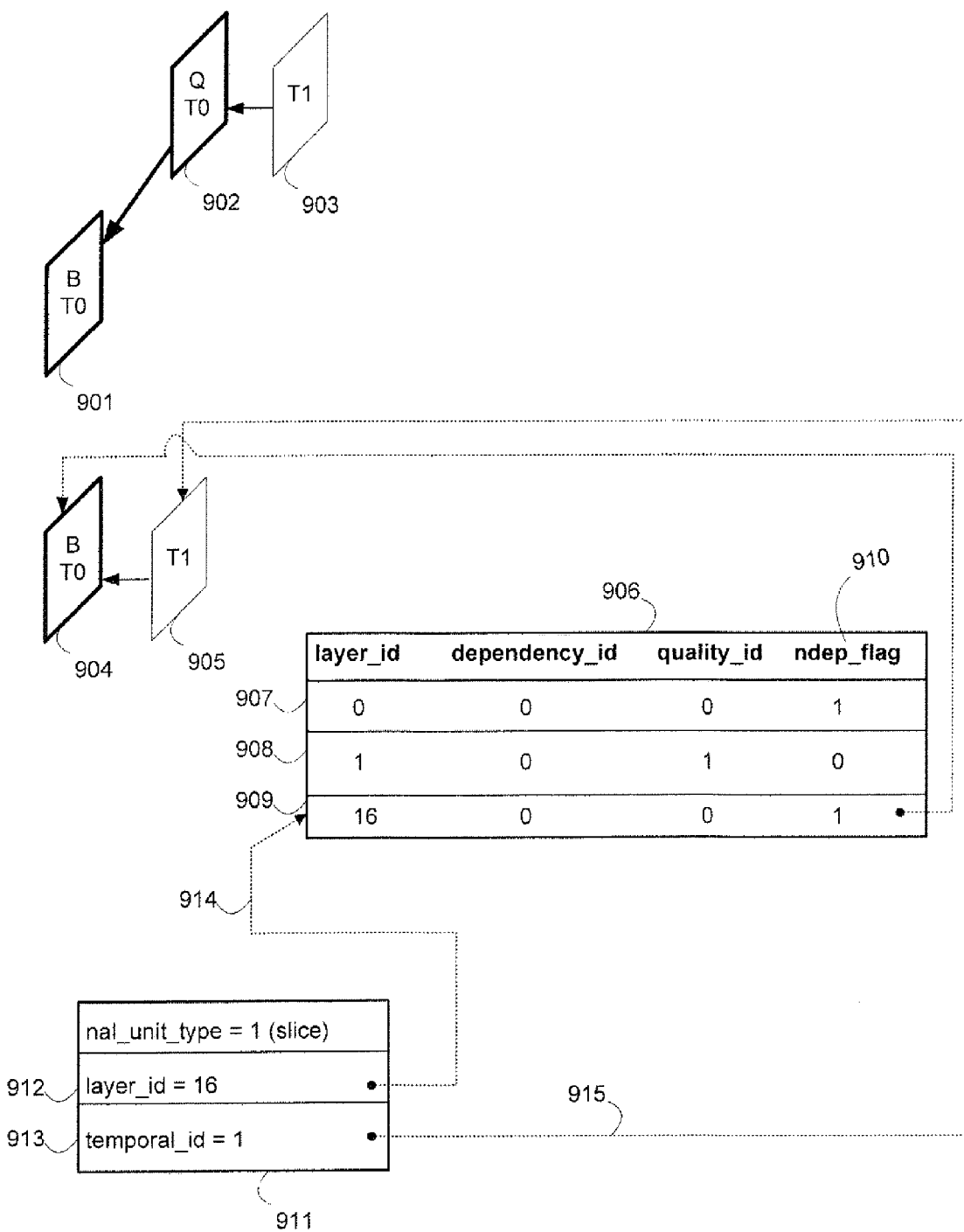
FIG. 9 presents a schematic illustration of the layer_id used by simulcast layers of two layer hierarchy and referencing a layer description in a table of layer descriptions.

FIG. 9 shows two layer structures. Base layer (901) is used for prediction by quality enhancement layer (902), which, in turn, is being referred to by a temporal enhancement layer (903). A second base layer (904) can be enhanced by a temporal enhancement layer (905). The two base layers can differ, for example, in their spatial resolution, which is one use case for simulcasting. In this example, base layer (904) is assumed to have a higher spatial resolution than base layer (901). As, in this example, only temporal and quality enhancement layers are in use, the spatial size of any enhancement layer can be the same as its respective (referenced) base layer. As a result, available in the scalable/simulcast bitstream are two resolutions, at different temporal and/or quality versions.

A layer description table (906) can be populated with entries (907) (909) for the two base layers (902) (904), respectively, and with an entry (908) for the spatial enhancement layer (903). The two base layers are identified by the no_inter_layer_prediction_flag (910) set to 1, whereas in the layer description table entry for the spatial enhancement layer (which can require another layer for prediction) the no_inter_layer_prediction_flag is set to 0.

An encoder can control the values used for layer_id. In the example, the encoder has exercised this control by dividing the numbering range allowed by the (in the example) 5 bit binary coded layer_id field such that one base layer uses layer_id 0, and the other uses layer_id 16.

Also shown is a NAL unit header (911), containing a layer_id (912) referring (914) to the corresponding entry in the table (909), and a temporal_id (913) referring (915) to the selected temporal layer (905).

One potential shortcoming of H.264 with respect to the pre-SVC (pre 2007) NAL unit header syntax has been its lack of an extension mechanism. In an embodiment, an extension mechanism can be added by reserving a pre-defined layer_id, for example layer_id 31 (the highest layer_id representable with a 5 bit binary coded integer) as an indication that at least one more octet of NAL unit header information follows. The syntax of this extension octet may not necessarily need to be defined today. A decoder not compliant with a standard version before enacting of the extension can, for example, ignore the extension octets.

Another potential shortcoming of H.264's high level syntax was the existence of the prefix NAL unit. As already described, this NAL unit can include two flags: use_ref_base_pic_flag and store_ref_base_pic_flag. In H.264, these flags are used for a technique known as Medium Grain Scalability (MGS). In order to support MGS in HEVC, these flags can be located in the slice header of base layer slices.

A use_ref_base_pic_flag can indicate that an enhancement quality layer picture is coded using inter layer prediction from a base layer picture. The flag can be located in the slice header of a slice belonging to a base layer picture.

A store_ref_base_pic_flag can require a decoder to store the current base layer picture in the reference picture buffer for possible later use. The store_ref_base_pic_flag can be located in the slice header of a slice belonging to a base layer picture to be stored in the reference picture buffer.

The use_ref_base_pic_flag and/or store_ref_base_pic_flag can also be located in fields in the NAL unit header, serving a similar purpose as already described. The overhead of placing the flags in the slice header or NAL unit header can be approximately the same.

The aforementioned syntax can be used, for example, in a decoder as follows.

Figure 10:
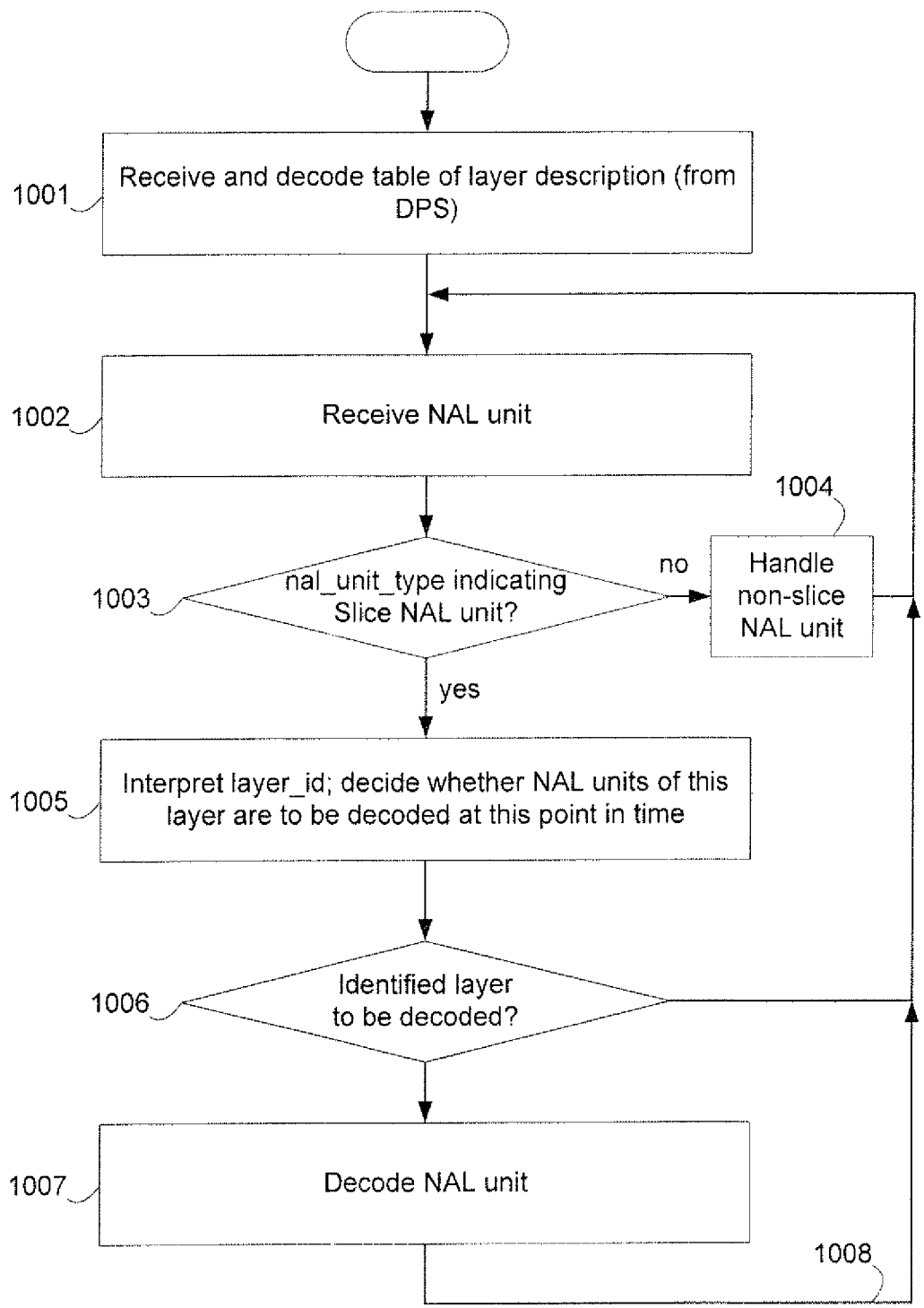
FIG. 10 presents a flowchart of a decoder using a NAL unit header.

Referring to FIG. 10, a decoder can receive and decode a coded table of layer descriptions (1001). Co-pending U.S. patent application Ser. No. 61/451,454 (DPS) describes, among other things, a mechanism for this step. The table of layer descriptions can be assumed to be static during, for example, a sequence (identified by IDR pictures in all layers), or a group of pictures. Co-pending Ser. No. 61/451,454 describes an activation mechanism for a dependency parameter set that can be used to ensure that a change in the table of layer descriptions can only occur at well-defined points in the scalable bitstream.

According to the disclosed subject matter, any decoder, including a decoder incapable of decoding a scalable bitstream, can be capable of receiving and decoding a table of layer descriptions. A decoder incapable of decoding, for example, a quality enhancement layer, can, by interpreting the table of layer description, identify layer_id values for quality enhancement layers and react accordingly, for example by discarding all such NAL units it may receive. Even a decoder incapable of any scalable mechanism can still identify the layer ids of the one or more (in case of simulcast) independently decodable base layers.

With the layer descriptions received and decoded, the decoding of NAL units of the layers described in the table of layer descriptions can commence. A NAL unit can be received (1002). Non-slice NAL units, such as parameter set NAL units, SET messages, and others, can be identified (1003) by interpreting the nal_unit_type field, and can be dealt with (1004).

A slice NAL unit can contain a layer_id, which can be interpreted (1005) and can trigger, for example, decoding or discarding of the NAL unit. The interpretation can involve, for example, de-referencing the layer_id to address an entry in the table of layer descriptions as already described. Based on this information, the decoder can determine whether the NAL unit belongs to a layer that should be decoded. This determination can involve many options. For example, a decoder can decide not to decode a NAL unit, if it is incapable of decoding it because it does not understand its type of layer, because it has not enough decoding cycles, because it knows that a layer on which the received NAL unit depends on has been damaged (i.e. through packet loss), the layer does not give a sufficient benefit for the user (i.e. the screen resolution is too small to make rendering of the high spatial resolution of the layer practical or helpful), and so on. Some of this options can be static in the sense that they apply to all NAL units of a coded bitstream nature (i.e. a decoder that is not implementing the decoding techniques for a certain enhancement layer type can discard any NAL units that are of that type), and others can be dynamic (i.e. NAL units of dependent enhancement layers can normally be decoded, but can be discarded if the base layer is damaged).

Any NAL unit with a layer_id not present in the table of layer descriptions can be an indication of a non-conforming scalable bitstream. Many reactions of a decoder are possible to non-conforming bitstreams. In this situation, one sensible decoder design can be to discard the received NAL unit.

Based on the above, a decoder decides (1006) to decode (1007) the NAL unit, or to discard it.

Operation continues (1008) with the next NAL unit of the scalable bitstream.

A MANE can perform similar steps, with the exception that a MANE will normally not decode a slice NAL unit, but rather selectively forward it to decoder(s).

The methods for video coding, described above, can be implemented as computer software using computer-readable instructions and physically stored in computer-readable medium. The computer software can be encoded using any suitable computer languages. The software instructions can be executed on various types of computers. For example, FIG. 11 illustrates a computer system 1100 suitable for implementing embodiments of the present disclosure.

Figure 11:
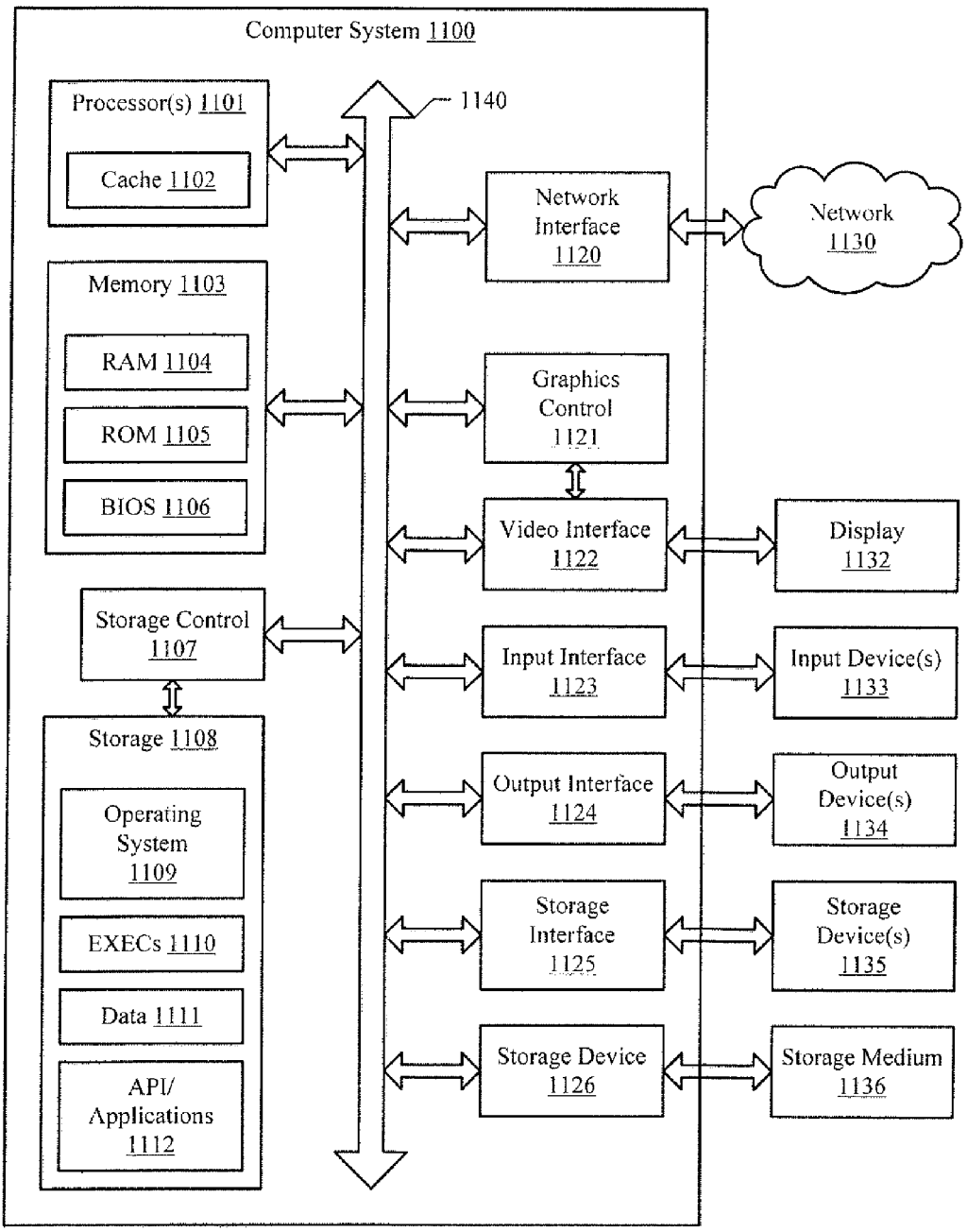
FIG. 11 shows a computer system for video coding in accordance with an embodiment of the disclosed subject matter.

The components shown in FIG. 11 for computer system 1100 are exemplary in nature and are not intended to suggest any limitation as to the scope of use or functionality of the computer software implementing embodiments of the present disclosure. Neither should the configuration of components be interpreted as having any dependency or requirement relating to any one or combination of components illustrated in the exemplary embodiment of a computer system. Computer system 1100 can have many physical forms including an integrated circuit, a printed circuit board, a small handheld device (such as a mobile telephone or PDA), a personal computer or a super computer.

Computer system 1100 includes a display 1132, one or more input devices 1133 (e.g., keypad, keyboard, mouse, stylus, etc.), one or more output devices 1134 (e.g., speaker), one or more storage devices 1135, various types of storage medium 1136.

The system bus 1140 link a wide variety of subsystems. As understood by those skilled in the art, a "bus" refers to a plurality of digital signal lines serving a common function. The system bus 1140 can be any of several types of bus structures including a memory bus, a peripheral bus, and a local bus using any of a variety of bus architectures. By way of example and not limitation, such architectures include the Industry Standard Architecture (ISA) bus, Enhanced ISA (EISA) bus, the Micro Channel Architecture (MCA) bus, the Video Electronics Standards Association local (VLB) bus, the Peripheral Component Interconnect (PCI) bus, the PCI-Express bus (PCI-X), and the Accelerated Graphics Port (AGP) bus.

Processor(s) 1101 (also referred to as central processing units, or CPUs) optionally contain a cache memory unit 1102 for temporary local storage of instructions, data, or computer addresses. Processor(s) 1101 are coupled to storage devices including memory 1103. Memory 1103 includes random access memory (RAM) 1104 and read-only memory (ROM) 1105. As is well known in the art, ROM 1105 acts to transfer data and instructions uni-directionally to the processor(s) 1101, and RAM 1104 is used typically to transfer data and instructions in a bi-directional manner. Both of these types of memories can include any suitable of the computer-readable media described below.

A fixed storage 1108 is also coupled bi-directionally to the processor(s) 1101, optionally via a storage control unit 1107. It provides additional data storage capacity and can also include any of the computer-readable media described below. Storage 1108 can be used to store operating system 1109, EXECs 1110, application programs 1112, data 1111 and the like and is typically a secondary storage medium (such as a hard disk) that is slower than primary storage. It should be appreciated that the information retained within storage 1108, can, in appropriate cases, be incorporated in standard fashion as virtual memory in memory 1103.

Processor(s) 1101 is also coupled to a variety of interfaces such as graphics control 1121, video interface 1122, input interface 1123, output interface 1124, storage interface 1125, and these interfaces in turn are coupled to the appropriate devices. In general, an input/output device can be any of: video displays, track balls, mice, keyboards, microphones, touch-sensitive displays, transducer card readers, magnetic or paper tape readers, tablets, styluses, voice or handwriting recognizers, biometrics readers, or other computers. Processor(s) 1101 can be coupled to another computer or telecommunications network 1130 using network interface 1120. With such a network interface 1120, it is contemplated that the CPU 1101 might receive information from the network 1130, or might output information to the network in the course of performing the above-described method. Furthermore, method embodiments of the present disclosure can execute solely upon CPU 1101 or can execute over a network 1130 such as the Internet in conjunction with a remote CPU 1101 that shares a portion of the processing.

According to various embodiments, when in a network environment, i.e., when computer system 1100 is connected to network 1130, computer system 1100 can communicate with other devices that are also connected to network 1130. Communications can be sent to and from computer system 1100 via network interface 1120. For example, incoming communications, such as a request or a response from another device, in the form of one or more packets, can be received from network 1130 at network interface 1120 and stored in selected sections in memory 1103 for processing. Outgoing communications, such as a request or a response to another device, again in the form of one or more packets, can also be stored in selected sections in memory 1103 and sent out to network 1130 at network interface 1120. Processor(s) 1101 can access these communication packets stored in memory 1103 for processing.

In addition, embodiments of the present disclosure further relate to computer storage products with a computer-readable medium that have computer code thereon for performing various computer-implemented operations. The media and computer code can be those specially designed and constructed for the purposes of the present disclosure, or they can be of the kind well known and available to those having skill in the computer software arts. Examples of computer-readable media include, but are not limited to: magnetic media such as hard disks, floppy disks, and magnetic tape; optical media such as CD-ROMs and holographic devices; magneto-optical media such as optical disks; and hardware devices that are specially configured to store and execute program code, such as application-specific integrated circuits (ASICs), programmable logic devices (PLDs) and ROM and RAM devices. Examples of computer code include machine code, such as produced by a compiler, and files containing higher-level code that are executed by a computer using an interpreter. Those skilled in the art should also understand that term "computer readable media" as used in connection with the presently disclosed subject matter does not encompass transmission media, carrier waves, or other transitory signals.

As an example and not by way of limitation, the computer system having architecture 1100 can provide functionality as a result of processor(s) 1101 executing software embodied in one or more tangible, computer-readable media, such as memory 1103. The software implementing various embodiments of the present disclosure can be stored in memory 1103 and executed by processor(s) 1101. A computer-readable medium can include one or more memory devices, according to particular needs. Memory 1103 can read the software from one or more other computer-readable media, such as mass storage device(s) 1135 or from one or more other sources via communication interface. The software can cause processor(s) 1101 to execute particular processes or particular parts of particular processes described herein, including defining data structures stored in memory 1103 and modifying such data structures according to the processes defined by the software. In addition or as an alternative, the computer system can provide functionality as a result of logic hardwired or otherwise embodied in a circuit, which can operate in place of or together with software to execute particular processes or particular parts of particular processes described herein. Reference to software can encompass logic, and vice versa, where appropriate. Reference to a computer-readable media can encompass a circuit (such as an integrated circuit (IC)) storing software for execution, a circuit embodying logic for execution, or both, where appropriate. The present disclosure encompasses any suitable combination of hardware and software.

While this disclosure has described several exemplary embodiments, there are alterations, permutations, and various substitute equivalents, which fall within the scope of the disclosure. It will thus be appreciated that those skilled in the art will be able to devise numerous systems and methods which, although not explicitly shown or described herein, embody the principles of the disclosure and are thus within the spirit and scope thereof.

The invention claimed is:

1. A method for video decoding, comprising:
    receiving a Dependency Parameter Set (DPS) pertaining to a coded video sequence in a layered format and comprising a plurality of layer descriptions, each identified by a first layer_id_and including at least one property of the layer;
    receiving a Network Adaptation Layer (NAL) unit header comprising a second layer_id and a temporal id;
    identifying one of the plurality of layer descriptions of the DPS by matching the second layer_id with the first layer_id; and
    determining at least one property of the layer that the NAL unit belongs to from the identified one of the plurality of layer descriptions;
    wherein the DPS includes a dependency parameter set id, the dependency parameter set id being referred to from a slice header;
    wherein the DPS is activated once in the coded video sequence and pertains to all pictures of the coded video sequence;
    wherein the NAL unit header does not include the at least one property; and
    wherein the at least one property comprises at least one of: a dependency id, a quality id, a view id, a depth map flag, and a dependent flag.

2. The method of claim 1, wherein the temporal_id identifies a temporal sub-layer of a layer identified by the layer_id.

3. The method of claim 1, wherein the depth_map_flag indicates that the first layer the NAL unit belongs to is a depth map, and is associated with a second layer identified by having the same view_id as the first layer.

4. The method of claim 1, wherein a predefined value for the second layer_id identifies the presence of extension data.

5. The method of claim 1, wherein the first layer_id is an indication of a position of the layer in a layer hierarchy.

6. The method of claim 1, wherein the NAL unit header further comprises at least one of: a store_ref_base_pic_flag and a use_ref_base_pic_flag.

7. The method of claim 1, wherein the NAL unit header is a slice NAL unit header, and the slice header of the slice carried in the NAL unit comprises at least one of a store_ref_base_pic_flag, and use_ref_base_pic_flag.

8. A method for video encoding, comprising:
    determining a layer structure comprising at least one layer having a first layer_id;
    encoding a Dependency Parameter Set (DPS) pertaining to a coded video sequence in a layered format, the DPS including a representation of the layer structure and a plurality of layer descriptions comprising at least one property of the layer; and
    encoding at least one Network Adaptation Layer (NAL) unit comprising an NAL unit header, the NAL unit header comprising a second layer_id and a temporal id;
    wherein the second layer_id is the same as the first layer_id;
    wherein the NAL unit header does not include the at least one property;
    wherein the DPS includes a dependency parameter set id, the dependency parameter set id being referred to from a slice header;
    wherein the DPS is activated once in the coded video sequence and pertains to all pictures of the coded video sequence; and
    wherein the at least one property comprises at least one of: a dependency id, a quality id, a view id, a depth map flag, and a dependent flag.

9. The method of claim 8, wherein the temporal_id identifies a temporal sub-layer of a layer identified by the layer_id.

10. The method of claim 8, wherein the depth_map_flag indicates that the first layer the NAL unit belongs to is a depth map, and is associated with a second layer identified by having the same view_id as the first layer.

11. The method of claim 8, wherein a predefined value for the second layer_id identifies the presence of extension data.

12. The method of claim 8, wherein the first layer_id is an indication of a position of the layer in a layer hierarchy.

13. The method of claim 8, wherein the NAL unit header further comprises at least one of: a store_ref_base_pic_flag and a use_ref_base_pic_flag.

14. The method of claim 8, wherein the NAL unit header is a slice NAL unit header, and the slice header of the slice carried in the NAL unit comprises at least one of a store_ref_base_pic_flag, and use_ref_base_pic_flag.

15. A method for removing Network Adaptation Layer (NAL) units from a scalable bitstream, comprising:
    receiving and decoding a Dependency Parameter Set (DPS) pertaining to a coded video sequence in a layered format and comprising a plurality of layer descriptions, each identified by a first layer_id and including at least one property of the layer;
    receiving a slice NAL unit comprising a NAL unit header comprising a second Layer_id and a temporal id;
    identifying one of the plurality of layer descriptions of the DPS by matching the second layer_id with the first layer_id; and
    removing the slice NAL unit only if the identified one of the plurality of layer descriptions indicates that the NAL unit belongs to a layer to be removed;
    wherein the DPS includes a dependency parameter set id, the dependency parameter set id being referred to from a slice header;
    wherein the DPS is activated once in the coded video sequence and pertains to all pictures of the coded video sequence;
    wherein the NAL unit header does not include the at least one property; and
    wherein the at least one property comprises at least one of: a dependency id, a quality id, a view id, a depth map flag, and a dependent flag.

16. The method of claim 15, wherein, the DPS comprises a plurality of layer descriptions each having a layer_id, wherein no first layer described by a first layer description is depending on a second layer described by a second layer description, and wherein the layer_id of the first layer description is numerically lower than the layer_id of the second layer description.

17. The method of claim 15, wherein, the DPS comprises a plurality of layer descriptions each having a layer_id, wherein no first layer described by a first layer description is depending on a second layer described by a second layer description, and wherein the layer_id of the first layer description is numerically higher than the layer_id of the second layer description.

18. A non-transitory computer readable medium comprising a set of instructions to direct a processor to perform the method of claim 1.

19. A non-transitory computer readable medium comprising a set of instructions to direct a processor to perform the method of claim 8.

20. A non-transitory computer readable medium comprising a set of instructions to direct a processor to perform the method of claim 15.

* * * * *